Patented Aug. 11, 1936

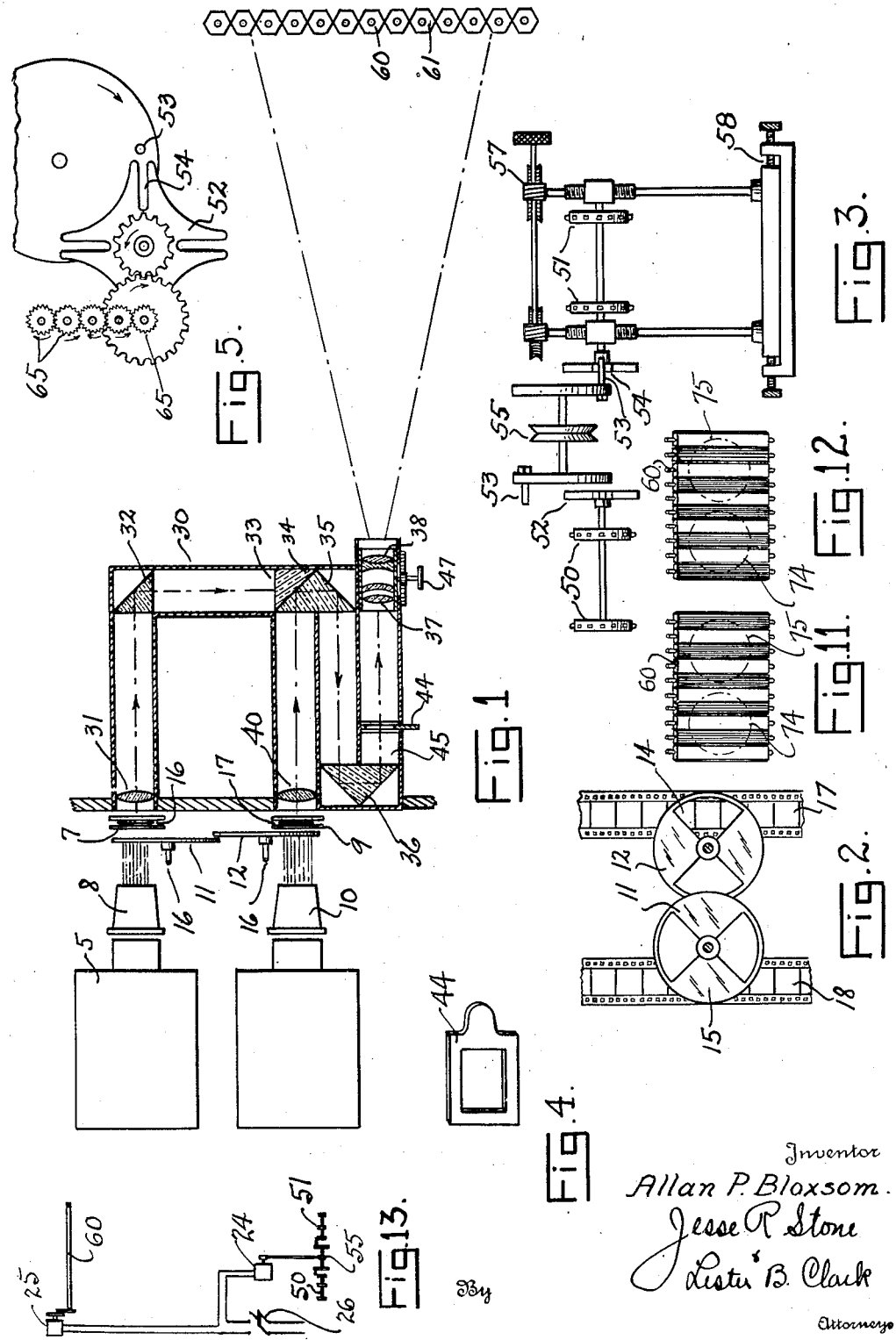

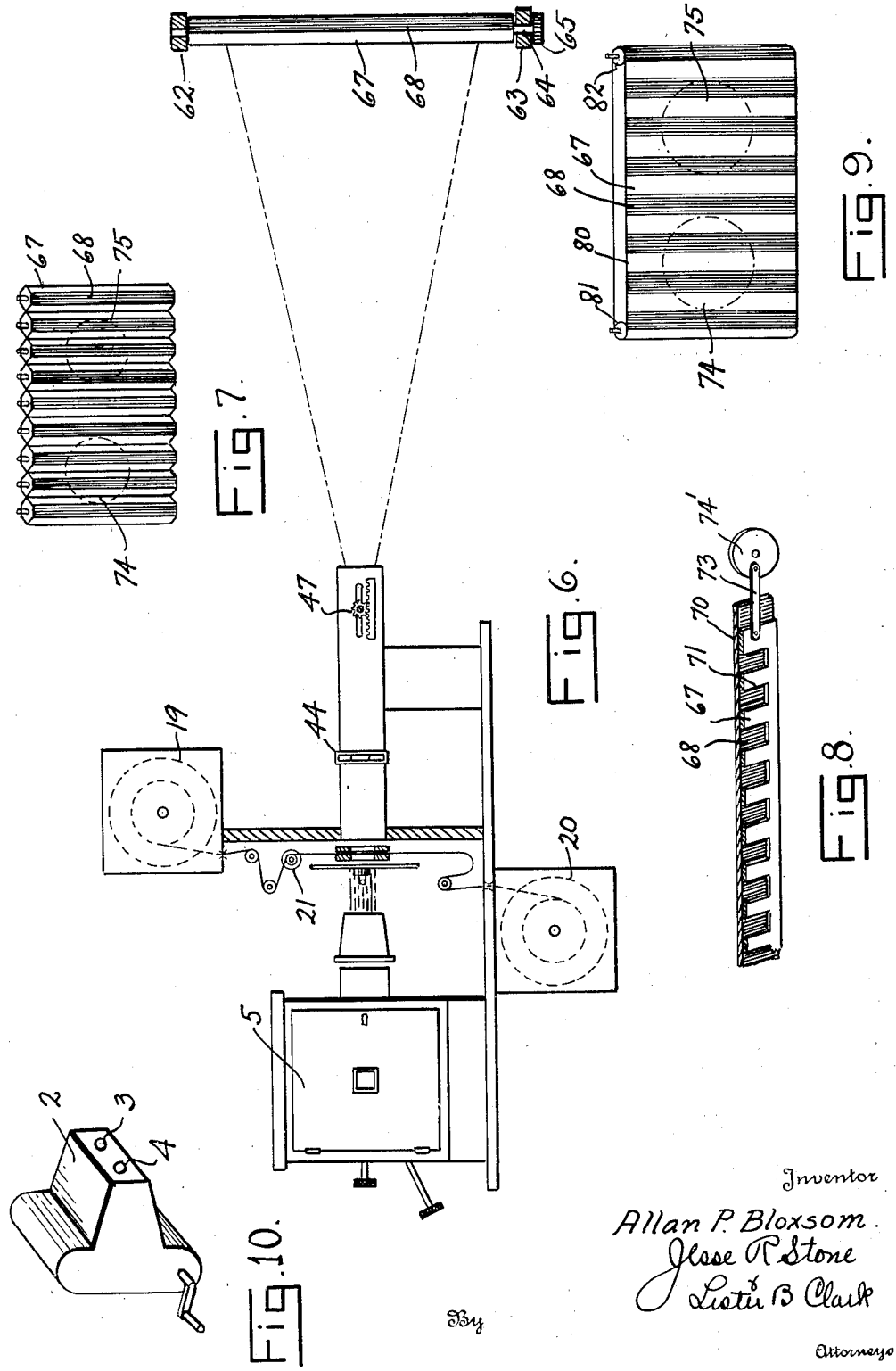

2,050,826

UNITED STATES PATENT OFFICE 2,050,826

COMBINATION STEREOSCOPIC MOTION PICTURE PROJECTOR AND SCREEN

Allan Penny Bloxsom, Houston, Tex.

Application May 21, 1934, Serial No. 726,711

1 Claim. (Cl. 88—16.6)

The invention relates to an improvement in stereoscopic motion picture projectors, in combination with a stereoscopic motion picture screen so arranged that the projector and screen are synchonized to effect a continuous showing of binocular pictures.

The successful projection of stereoscopic pictures has been hampered considerably because of the previous arrangement of the projectors and the fact that viewing boxes or glasses were required in order to properly view the pictures. It is with the object of avoiding these previous objectionable features that the present device has been conceived.

It is one of the objects of the invention to project right and left pictures in such a manner that they will be fused together and projected upon a screen which is operating synchronously with the projectors to vary the projecting surfaces viewed by the centers of the visual field of the two eyes.

Another object of the invention is to devise a manner of projecting stereoscopic pictures so that no viewing boxes or glasses before the eyes will be required.

Another object of the invention is to provide a projector for fusing stereoscopic pictures before they are projected on the screen.

Another object of the invention is to project right and left pictures from a single projector in such a manner that the flicker now common in pictures will be eliminated.

Still another object of the invention is to so arrange the illumination of the picture being projected that a continuous illumination of the screen will be had.

Still another object of the invention is to project and screen moving pictures in such a manner that the properties of persistence of vision and optical synthesis of the human eye will be accommodated.

A still further object of the invention is to project right and left pictures in such a manner that the viewing thereof will furnish the impression of depth and solidity.

Still another object of the invention is to provide a motion picture projector with two films whose images will be fused together and projected as a single frame of film.

Still another object of the invention is to project two moving pictures in such a manner that one picture is always being projected upon the screen.

Another object of the invention is to provide a moving picture screen made up of a background of highly reflective and less reflective alternate surfaces.

Another object of the invention is to provide reflective and less reflective surfaces which will alternate with each other in order to make up a screen in such a manner that the visual field of each eye will have presented to it a different reflective surface than that of the visual field of the other eye.

Still another object of the invention is to provide a moving picture screen wherein there are alternate highly reflective surfaces and less highly reflective surfaces arranged and spaced in such a manner that they will furnish a different visual field for each eye.

Another object of the invention is to synchronize a motion picture projector and a motion picture machine so that left and right pictures being projected will be viewed with a greater reflective surface by the left eye when a left picture is being projected, and with a greater reflective surface by the right eye when a right picture is being projected.

Another object of the invention is to synchronize the movement of the film with the movement of the reflecting surface of the screen in such a manner that the desired reflecting surface will be exposed on the screen in accordance with the picture which is being projected.

Another object of the invention is to project alternate right and left moving pictures from the same projection machine.

Other and further objects of the invention will be readily apparent when the following description is considered in connection with the accompanying drawings, wherein:

Fig. 1 is a diagrammatic view of a combination projector and screen by which the invention may be practiced.

Fig. 2 shows an arrangement of the projecting discs whereby there is a continuous projection of the pictures and alternate right and left pictures are exposed.

Fig. 3 shows one arrangement of the projecting apparatus whereby adjustment and variation of the films may be obtained in order to accomplish proper projection.

Fig. 4 is a view of a frame which may be used in the projector of Fig. 1, in order to obtain a definite outline for the frame of the picture.

Fig. 5 shows an arrangement of the synchronism of the moving picture machine and the screen operation so that the desired results will be obtained.

Fig. 6 is a side elevation of the device shown in Fig. 1 illustrating the arrangement of the projector and the screen.

Fig. 7 is a broken detail view of one form of the screen and illustrating the visual fields of the eyes.

Figs. 8 and 9 show modified forms of the screen which may be used in order to obtain different reflecting surfaces.

Fig. 10 is a perspective view of one form of camera which may be used in taking the stereoscopic pictures.

Fig. 11 shows still another form of the screen wherein the left field of vision is provided with a highly reflective surface and the right field of vision is shown as having a less reflective surface.

Fig. 12 is the same type of screen shown in Fig. 11 but with the reflecting surfaces reversed so that the right field of vision has the greater reflective surface and the left field of vision has the lesser reflective surface.

Fig. 13 is a diagrammatic view showing the synchronous arrangement of the frame of the screen in order to project and screen the right and left pictures.

It is intended that the pictures will be taken by a camera such as 2 of Fig. 10, wherein the left picture will be taken from the opening 3 and the right picture from the opening 4.

When these pictures have been developed and are ready for projection they will be incorporated in a machine such as 5 which is shown in side elevation in Fig. 6, and in top plan view in Fig. 1. The left pictures will move through the area 7 and be illuminated by the lamp 8, whereas the right picture will move through the space 9 and be illuminated by the lamp 10. The blankout wheels 11 and 12 will serve to permit the step by step movement of the film in the usual manner. These wheels are illustrated in Fig. 2 and will be so synchronized that the opening 14 in the wheel 12 will be exhibiting a right picture while the blankout space 15 in the wheel 11 will be covering the left hand film to permit movement thereof. With this arrangement it will always be either a right or a left film exposed. The right film is shown at 17 and the left film at 18. The rotation of the blankout wheels 11 and 12 is accomplished through suitable mechanism which drives the shaft 16 of each wheel.

In order that the film may be passed before the lenses the storage reels 19 and 20 are provided in the usual manner and the film is threaded over the guides 21 in a manner which is now well known.

In order that the right and left pictures may be properly projected, a stereoscopic housing 30 has been provided. In this housing the lens 31 is positioned to receive the beams from the lamp 8 and convey the impression of the left hand film 16 to a prism 32. This prism reflects the beam at right angles so that it strikes the intermediate prism 33. The prism 33 is so constructed that it has a silvered surface at 34 which is half transparent so that half of the beam from prism 32 passes the prism 33 and continues to a prism 36 and from there to the focusing lenses 37 and 38.

The half of the beam from the lens 31 which is reflected by the surface 34 is, of course, reflected away from the prism 35 so that it is not projected.

The lens 40 which permits the passage of the beam from the right-hand film 17 and the lamp 10 directs the beam upon the prism 35 and against the half silvered surface 34 so that half of the beam passes through the silvered surface and half is doubly reflected, to be received by the prism 36. In this manner half of the beam from each of the lenses 31 and 40 is reflected to the prism 36 by the alternate absorbing of the right and left films. The frame 44 is provided in the passage-way 45 in order to cut a definite picture which will pass to the lenses 37 and 38. The frame 44 is adjustable as are the lenses 37 and 38, these latter being adjustable by the handscrew 47.

The mechanism for driving the films is illustrated in Fig. 3 wherein the left-hand film is arranged to be engaged by the sprockets 50 and the right-hand film by the sprockets 51. These sprockets are intermittently driven by the usual type of Geneva wheel illustrated at 52 wherein the pin 53 is arranged to engage in the float 54 in the Geneva wheel in order to rotate one-fourth of a revolution for each revolution of the drive pulley 55. The right-hand sprockets 51 are driven in a similar manner but it will be noted that drive wheels are so disposed that the pins 53 thereon are on opposite ends of a diameter so that one film is stationary while the other is moving.

In order to provide for suitable adjustment of the sprocket wheels 51 the worm and pinion gears 57 are provided so that the frame of any picture may be centered as necessary. By turning the gears 57 the sprockets 51 may be raised or lowered a limited amount, so that the relative positions of the pin 53 and the float 54 will be shifted slightly, giving a resultant vertical shift in the frame of the picture. Lateral adjustment of the sprocket wheels is provided by the thumb-screw arrangement 58.

The screen 60 is best seen in Figs. 1 and 6 and in this form of screen is illustrated as being made up of a plurality of hexagonal members 61. These members are mounted for rotation as seen in Fig. 6 in the upper bar 62 and the lower bar 63 by means of a shaft 64 which projects from either end of the screen members. A single gear 65 is fixed on the shaft 64 so that rotation may be imparted to the screen member.

Each screen member in this form of the screen is made up of a hexagonal member wherein the alternate surfaces are constructed of different reflective properties; that is, three of the surfaces such as 67 are highly reflective, while the three alternate surfaces such as 68 are less reflective. The screen members are so arranged in the frames 62 and 63 that less reflective surface will be exposed on each member at the same time in the forward position. In this manner the space between the least reflective surface on two adjacent members will constitute the higher reflective surface 67, so that the screen will have the appearance seen in Fig. 7 of alternating high and low reflective surfaces.

The rotation of the screen members 60 is accomplished by synchronizing the movement of the screen with the Geneva mechanism shown in Fig. 5. A direct connection is shown in Fig. 5 in order to convey the inventive idea. The small pinions 65 are here seen as in contact with each other so that the adjacent screen members will rotate in opposite directions.

If desired, however, the synchronizing of the motion of the film and the screen member can be accomplished by the use of synchronized driving motors instead of by a mechanical connection. Devices of this type are old and are well known and need not here be described.

Fig. 8 shows a modified form of the screen member wherein the frame 70 is adapted to slidably support the screen member 71 which is made up of alternate high reflecting surfaces 67 and lesser reflecting surfaces 68. This screen member is arranged for reciprocation by means of the pitman rod connection 73 which is actuated by suitable eccentric cam members 74. The stroke of the pitman rod would be equal to the width of the reflecting surfaces, so that with the fields of vision as indicated in Fig. 7, the predominating light or dark reflecting surfaces would move into the area of vision. In Fig. 7 the left field of vision is indicated at 74 and the right field of vision indicated at 75. It will be noted that the left field of vision is predominantly light, while the right field of vision is predominantly dark.

The areas 74 and 75, referred to as left and right fields of vision, are indicated to aid in the description of the invention and its mode of operation. The areas 74 and 75 may be considered as being outlines of an observer's eyes projected upon a screen, and are, therefore, given a center spacing equal to the average interocular distance. It will be noted that the spacing of the light reflecting surfaces and the light absorbing surfaces is such that the centers of the areas 74 and 75 strike one of each regardless of how they may be shifted laterally, and therefore, it will be seen that of a pair of corresponding parallel lines of vision from the spectator's eyes, one will always strike a light reflective surface and the other a non-reflective surface.

It is known that the eyes will accommodate themselves in such a way that a pair of stereoscopic images of an object placed side by side will appear as a single bold solid object. The present invention employs this feature of binocular vision to assist in the presentation of stereoscopic motion pictures. Advantage is also taken of the tendency of the eye and mind to see or sense even distorted perspectives in the accustomed form and relation, this tendency causing the right and left eyes to each select and observe the proper series of images to the substantial exclusion of the other.

Fig. 9 shows still another form of screen wherein an endless belt or band 80 is mounted to travel about the spaced rollers 81 and 82, and wherein the screen 80 is provided with the alternate light and dark areas the same as in the previous screens. The rate of travel of this screen would be synchronized with the movement of the film the same as in the Fig. 6 modification, so that the fields of vision 74 and 75 would alternate in the predominating light or dark reflecting surfaces.

In Fig. 13 there is shown a diagram of wiring which might be employed to synchronize the projectors and screen. Synchronous motors 24 and 25, driving the projectors and screen respectively, are operated from a common source of power and are controlled by a suitable switch 26. By appropriate gearing these motors will operate the projectors and screen in correct timed relationship.

While the combination of the projector and screen has been shown and described, it is to be understood that various forms of the invention may be practiced.

What is claimed is:

A motion picture device for producing relief effects comprising in combination, a screen having closely spaced upright small sections of high reflecting surfaces and like intervening sections of relatively low reflecting power, means to move the sections to interchange the high and low reflecting surfaces, means to project in register alternate right and left view motion picture images on the screen, and means to interchange the sections between each projection.

ALLAN PENNY BLOXSOM.